United States Patent [19]
MacLennan et al.

[11] Patent Number: 5,644,965
[45] Date of Patent: Jul. 8, 1997

[54] SAW TOOTH FOR CIRCULAR SAW

[75] Inventors: Charles D. MacLennan, Hudson Heights; Nick Palfy, Chomedey; Laurier Savard, Terrebonne; Robert E. Mitchell, Montreal, all of Canada

[73] Assignee: Quadco Equipment Inc., St-Eustache, Canada

[21] Appl. No.: 267,242

[22] Filed: Jun. 29, 1994

[30] Foreign Application Priority Data

Apr. 5, 1994 [CA] Canada ................................. 2120595

[51] Int. Cl.⁶ .................................................. B27B 33/12
[52] U.S. Cl. ........................... 83/842; 83/839; 83/843; 144/241
[58] Field of Search ........................... 83/838, 839, 840, 83/841, 842, 843; 144/225, 241; 407/42, 36, 40

[56] References Cited

U.S. PATENT DOCUMENTS

| | | | |
|---|---|---|---|
| 2,736,352 | 5/1956 | Wright. | |
| 3,405,433 | 10/1968 | Williams | 407/40 |
| 4,231,406 | 11/1980 | Jonsson. | |
| 4,592,680 | 6/1986 | Lindsay | 407/36 |
| 4,932,447 | 6/1990 | Morin. | |
| 5,183,089 | 2/1993 | Norlander et al. | 83/842 X |
| 5,205,119 | 4/1993 | MacLennan. | |
| 5,211,212 | 5/1993 | Carlson et al. | 144/241 |

*Primary Examiner*—Rinaldi I. Rada
*Assistant Examiner*—Boyer Ashley
*Attorney, Agent, or Firm*—Swabey Ogilvy Renault

[57] ABSTRACT

A saw tooth for a circular saw for a feller including, in one embodiment, a square saw tooth head having a frusto-pyramidal shape to be mounted on a holder, and the saw tooth head includes seats for receiving inserts. The inserts are provided with cutting tips and cutting edges while a clamp nut retains the inserts against the tooth head. When the edges and tips are worn or damaged from impact, the inserts are first replaced. When the seat of the head is damaged, the tooth can be rotated.

8 Claims, 4 Drawing Sheets

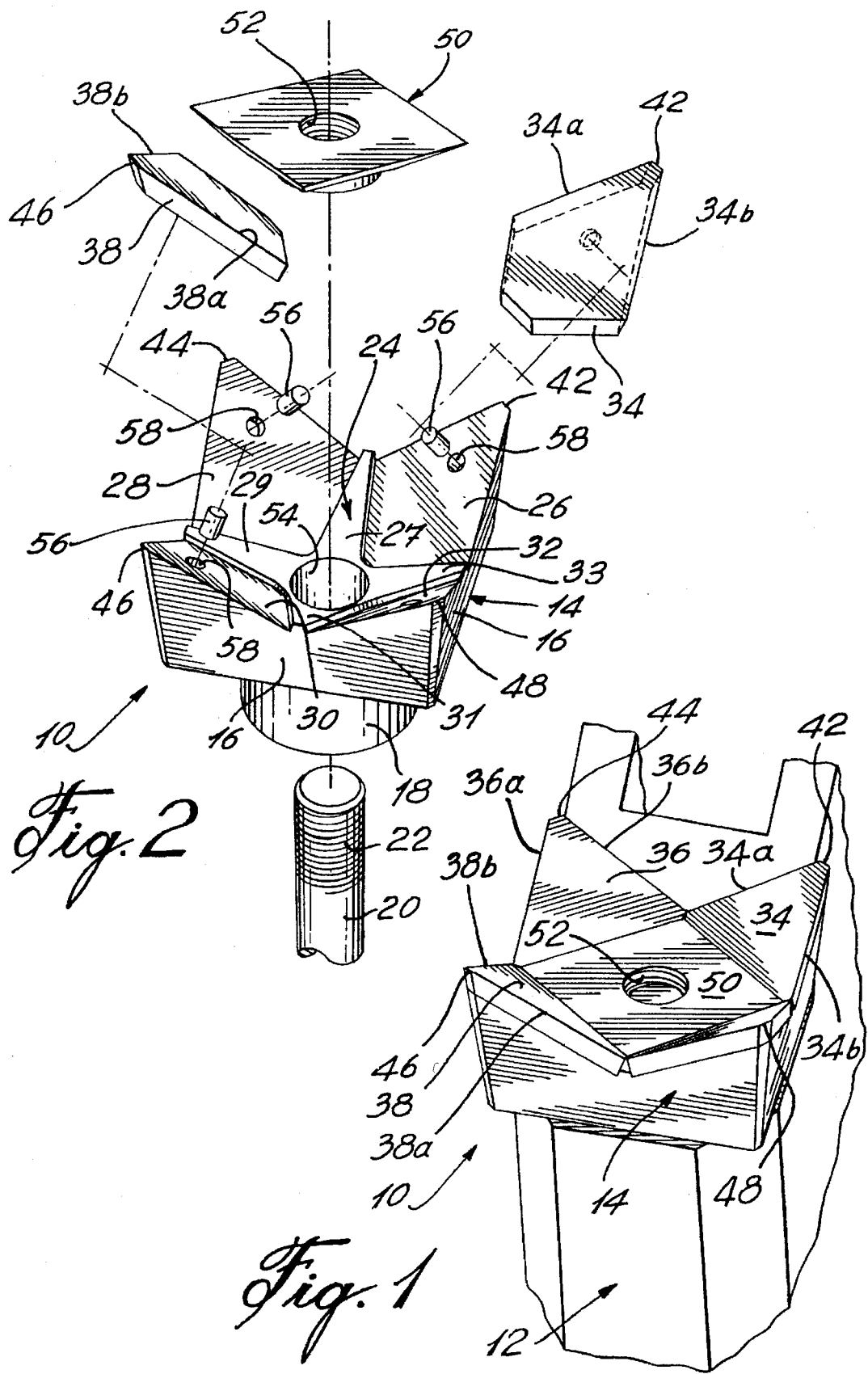

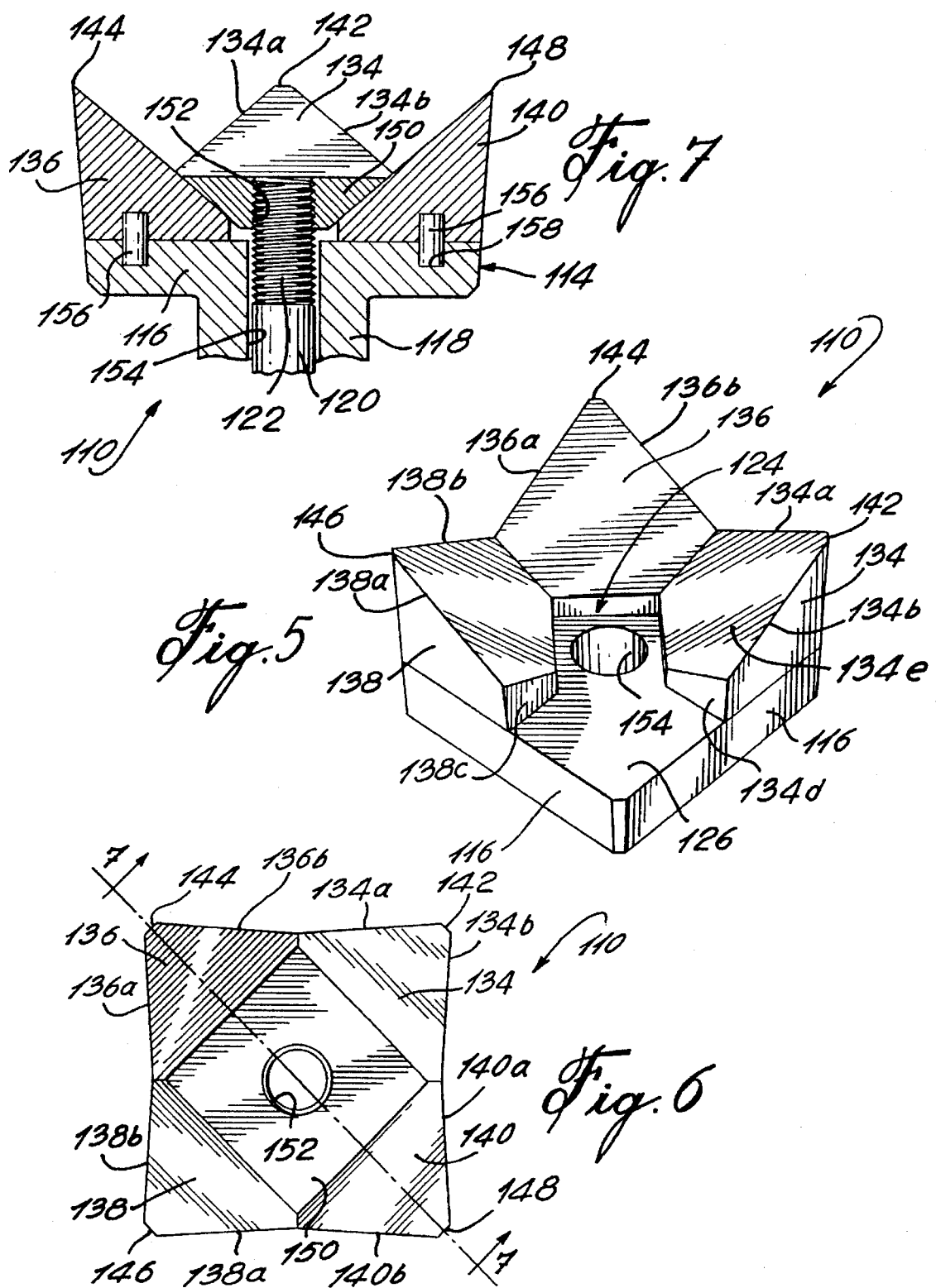

SAW TOOTH FOR CIRCULAR SAW

BACKGROUND OF THE INVENTION

1. Field of the Invention

The present invention relates to an improved saw tooth for circular saws, and more particularly, to a saw tooth with multiple cutting edges which can be replaced when the active cutting edges become dull or worn.

2. Description of the Prior Art

Saw teeth for circular saws of the type mounted on a feller head for a tree felling apparatus have undergone considerable change in the last few years.

U.S. Pat. No. 4,932,447, Morin, 1990, and U.S. Pat. No. 5,205,199, MacLennan, 1993, represent saw teeth which have become the standards in the industry. When the active cutting tips and edges become dull or worn, these saw teeth can be rotated to present different tips and cutting edges. In fact, the principle of rotating a saw tooth to present different cutting edges on a saw tooth was proposed as far back as 1956 in U.S. Pat. No. 2,736,352 by Wright and in 1980 by Jonsson in U.S. Pat. No. 4,231,406. The Wright patent describes a frusto-conical tooth for chain saws or circular saws presenting annular cutting edges which can be rotated to present a fresh cutting edge segment. The Jonsson patent describes a replaceable debarking tooth having four sides which can be rotated 90° to present a sharp cutting edge when the previous edge has become dull.

Morin '447 and MacLennan '199 both show replaceable saw teeth with four sides which can be rotated. The MacLennan patent provides V-shaped cutting edges with four planar surfaces defining cutting tips at the apex of these somewhat triangular surfaces. Flat triangular carbide inserts may overlie the flat surfaces to reinforce the cutting edges. These inserts are brazed to the tooth head. Morin '447 describes a four-sided tooth with concavely curved cutting edges formed by a spherical concave recess. Four cutting tips are present, one at each corner. In both MacLennan and Morin, it is necessary to rotate the tooth to provide sharp fresh tips and cutting edges.

Although theoretically the MacLennan or Morin teeth can be rotated four times before replacement, it is probably not practical. In fact, the most that such teeth can be rotated is three times. In practice, the active edge (remote from the center of the saw blade) of the tooth and the two adjacent tips are blunted by wear. In fact, the lower tip of the remote edge, when the tooth is mounted on the saw blade, is more susceptible to being blunted since it is the closest to the ground and more likely to hit a solid obstacle such as stones or sand. If this lower tip is blunted, it cannot be reused with another adjacent edge. Likewise, if the two tips adjacent the outer edge are blunted equally by wear or impact, then the tooth can only be rotated by 180°, that is, twice.

SUMMARY OF THE INVENTION

It is an aim of the present invention to provide a replaceable tooth for a rotary saw disc wherein the tips and adjacent side edges are also replaceable, thus increasing the life of the tooth.

It is a further aim of the present invention to reduce the frequency of rotation of the replaceable teeth and to increase the actual number of rotations thereof.

A construction in accordance with the present invention includes a replaceable tooth for a saw wherein the tooth comprises a tooth head of frusto-pyramidal configuration, a front face, a rear face, and lateral side walls extending therebetween, and a central bore extending axially of the head. The front face of the tooth head is provided with a seat for receiving at least an insert. The insert includes the cutting tips and cutting edges of the tooth, and clamp means clamp the insert against the seat on the front face while bolt means extending through the bore retain the clamp means, whereby the inserts are held by the clamp means on the seats of the front face such that the tooth includes cutting edges along the lateral face remote from the center of the saw blade and cutting tips at each corner thereof, and the bolt means can be manipulated to release the clamp means and thus allow the insert to be replaced on the tooth.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary perspective view of an embodiment of a tooth in accordance with the present invention;

FIG. 2 is an exploded perspective view of the tooth in accordance with the embodiment shown in FIG. 1;

FIG. 5 is a perspective view of another embodiment of the present invention with a portion thereof removed;

FIG. 6 is a top plan view of a tooth in accordance with the embodiment shown in FIG. 5;

FIG. 7 is a fragmentary axial cross-section taken along line 7—7 of FIG. 6; and

DESCRIPTION OF THE PREFERRED EMBODIMENTS

Figure 3:
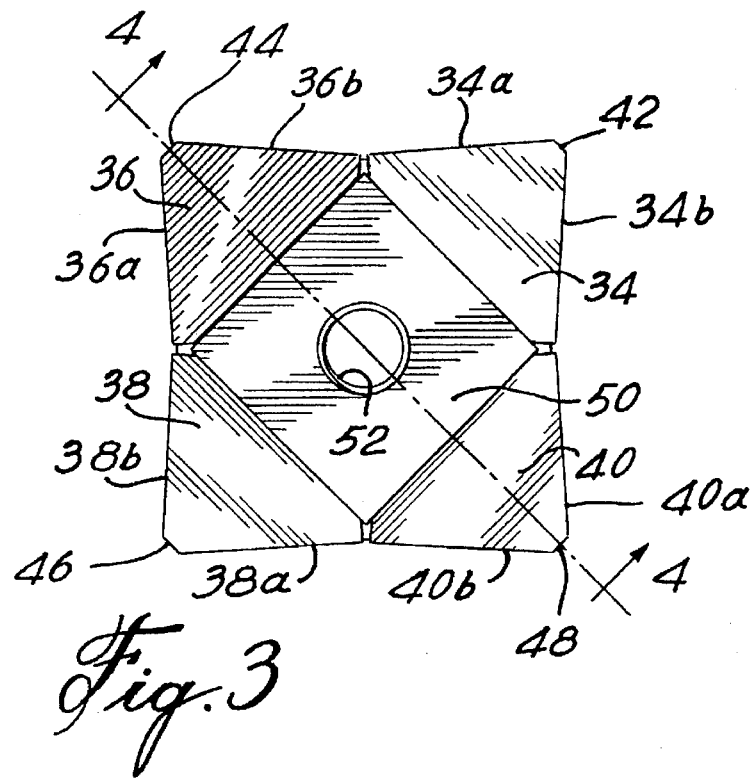
FIG. 3 is a top plan view thereof.

Referring now to the drawings and in particular the embodiment shown in FIGS. 1 to 4, there is shown a replaceable four-sided tooth 10 mounted on a holder 12 which in turn is bolted to the periphery of a circular saw blade used on a delimber (not shown). The saw tooth 10 includes a head 14 with four slightly tapered lateral side walls 16 forming a frusto-pyramid. A shank 18 extends on the rear side of the head 14 and defines, with the head 14, an axial bore 54.

A bolt 20 passes through the holder 12 and fastens the tooth 10 to the holder 12. Bolt 20 with its threads 22 will be described further.

The front face 24 of the tooth head 14 is recessed as shown in the drawings and includes quadrant seats 26, 28, 30, and 32. Upstanding ridges 27, 29, 31, and 33 separate the seats. Each seat 26, 28, 30, and 32 is a flat surface of somewhat pentagonal outline with a pair of edges forming a V with the tips 42, 44, 46, and 48 respectively. The edges are formed at the intersection of the flat planar seats 26, 28, 30, and 32, and the lateral side walls 16. The seats are made to receive inserts such as insert 34 on seat 26. Similar inserts 36, 38, and 40 are placed on seats 28, 30, and 32 respectively.

Figure 4:
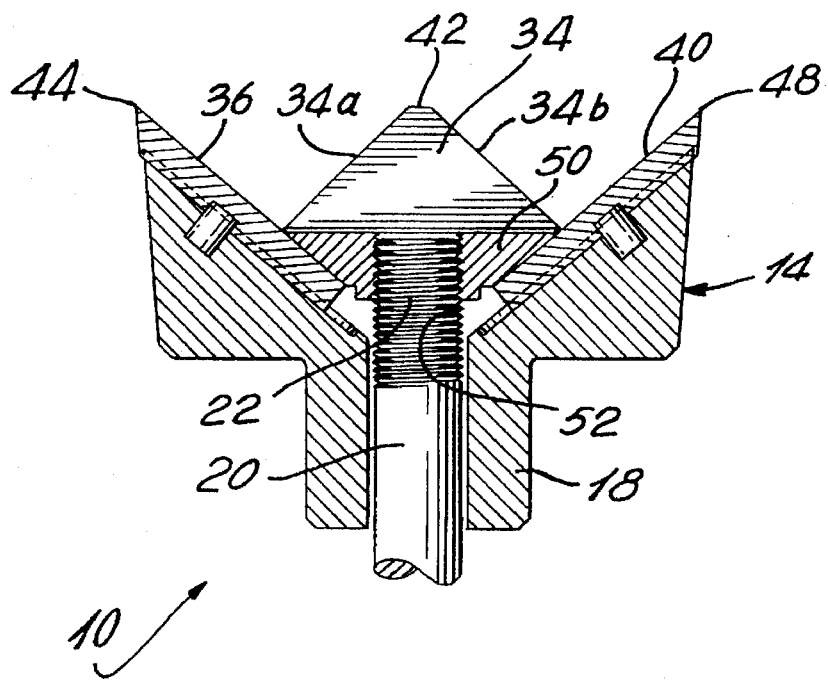
FIG. 4 is an axial cross-section taken along line 4—4 of FIG. 3.

Insert 34, for instance, will have a pair of cutting edges 34a and 34b which correspond to similar defined edges on the seat 26. The tip 42a of the insert 34 corresponds with the tip 42a at the seat. The insert is located on the seat 26 by means of dowel pin 56 sitting in recess 58 in the seat 26 and a corresponding recess in the insert 34. Inserts 36, 38, and 40 are identical to insert 34. Insert 36 includes cutting edges 36a, 36b, and tip 44a; insert 38 has cutting edges 38a and 38b meeting at cutting tip 46a; while insert 40 includes cutting edges 40a and 40b converging at tip 48a. The inserts are held in the seats by means of a clamp nut 50 which is in the form of a frusto-pyramid having a flat top surface and a threaded opening 52 centrally thereof. The clamp nut 50 sits in the central recess and bears against the inserts 34, 36, 38, and 40, as shown in FIGS. 3 and 4.

The bolt 20 with threads 22 engages threads 52 of the clamp nut 50. Thus, when the tooth 10 is mounted in the holder 12, the bolt 20, which is inserted from the rear of the holder 12, passes through the bore 54 of head 14 to engage the clamp nut 50 and retain all of the inserts in their seats as well as the head 14 to the holder 12.

The cutting tips 46a, 48a which are farthest away from the center of the circular saw disc will be worn along with the corresponding cutting edges. The bolt 20 is then loosened so as to space the clamp nut 50 from the head 14, thus allowing the corresponding inserts 38, 40 to be removed. These inserts, for instance, 38 and 40 (assuming tips 46a and 48a are the farthest away from the center of the saw blade), are the only inserts which need be removed to provide fresh sharp cutting edges and cutting tips to the tooth. Thus, it is not required to rotate the tooth at every instance when the edges of the inserts are worn. It is only necessary to rotate the whole tooth head 14 when the tip 44 or 42 of the head 14 or their respective seats is damaged by impact.

The inserts 34, 36, 38, and 40 may be made of steel or they may be a hardened material, such as tungsten carbide, depending on the environment in which the tooth is being used.

In the embodiment shown in FIGS. 5, 6, and 7, the reference numerals have been raised by 100 at least with respect to the corresponding elements. In FIGS. 5, 6, and 7, the tooth head 114 is flat at the front face 124. Thus, a seat 126 is provided to receive the inserts 134, 136, 138, and 140. The inserts are cast in the shape shown in FIG. 5, and insert 134 for instance, includes extensions of the side walls 116 and abutting walls 134c and 134d. The flat planar surface 134e on the top of the insert 134 is sloped to terminate at the cutting edges 134a and 134b and at the tip 142 at the apex thereof. Insert 136 likewise has cutting edges 136a, 136b meeting at tip 144; while insert 138 has cutting edges 138a, 138b converging at tip 146; and insert 140 has cutting edges 140a, 140b and tip 148. Abutting surface 138c of insert 138 is also shown.

The inserts 134, 136, 138, and 140 are mounted on the seat 126 and located by pins 156. A clamp nut 150 is engaged by the bolt 120 which has threads 122 to engage the threaded opening 152 of the nut 150. The nut 150 clamps the inserts into place on the recess 126 and retains the assembly on the holder (not shown). Inserts 134, 136, 138, 140 would be cast steel or the like. It is unlikely that these particular forms would be cast in a hardened alloy or other material such as tungsten carbide because of the difficulties and expense in producing such shapes. However, if such casting technologies improve, then these inserts could also be of hardened materials. An advantage of this form of cast insert 134 is that the angle of slope of surface 134e, for instance, can be varied and thus the angles of the edges 134a and 134b.

Figure 8:
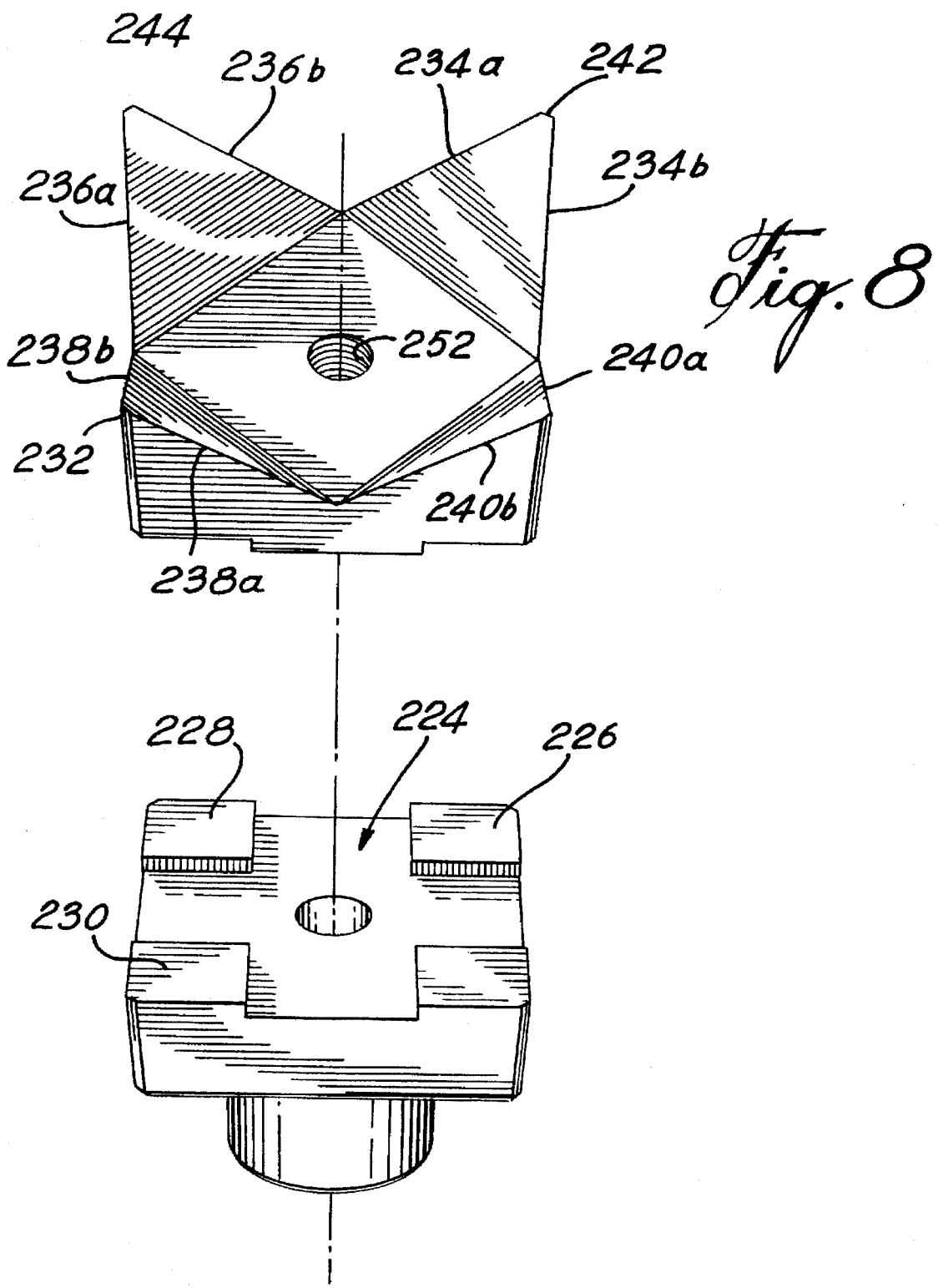
FIG. 8 is an exploded perspective view of yet another embodiment of the present invention.

The embodiment shown in FIG. 8 shows the reference numerals of similar elements raised by 200. The tooth head 214 in this case is provided with a cruciform recess 225 at the front face 224. A bore 254 is located axially of the head 214. The recess 225 is formed between pedestals 226, 228, 230, and 231 to receive a similar shaped rear face of the insert 232. The insert 232 is cast in a single block and includes the outstanding tips 242, 244, 246, and 248 with receding cutting edges, such as cutting edges 234a and 234b corresponding to tip 242 cutting edges 236a, 236b to tip 244; cutting edges 238a, 238b to tip 246; and cutting edges 240a, 240b to tip 248. The insert 232 is provided with a threaded opening 252 centrally thereof and is adapted to sit on a recess 225 of head 214. A bolt (not shown) will pass through the bore 254 and engage the threads 252 of the insert 232.

The insert 232 would be a cast steel component but could be cast using other hardened materials assuming improved technology to reduce the cost of forming such a monoblock insert.

In the embodiment shown in FIG. 8, it is the insert 232 which would be rotated to present fresh sharp tips and edges in the position remote from the center of the saw blade. The insert 232 will be rotated when the tips and edges wear or if any of the tips receives irreparable damage through impact. Once all of the tips have been worn or damaged, the insert can be replaced while leaving the head 214 on the holder.

We claim:

1. A replaceable saw tooth for a circular saw blade having an axis of rotation, wherein the tooth comprises a tooth head of frusto-pyramidal configuration, having a front face, a rear face, and planar side walls extending therebetween, a central bore extending axially of the head between the rear face and the front face, the front face of the tooth head having seat means and for receiving at least two inserts, each insert defining a single cutting tip with a pair of receding cutting edges such that the pair of inserts provides a pair of spaced-apart cutting tips subtending a cutting edge which is remote from the axis of rotation of the blade, each insert and the seat means having cooperating apertures and locating pins, clamp means overlying a portion of the inserts, bolt means extending through the bore and secured to the clamp means such that the inserts are securely held by means of the combination of the locating pins and apertures and the clamp means.

2. The replaceable saw tooth as defined in claim 1, wherein the clamp means is a clamp nut and the bolt means is a bolt inserted from the rear face of the tooth and threadably engageable with the clamp nut at the front face of the tooth head.

3. The saw tooth as defined in claim 1, wherein said seat means is a flat planar surface perpendicular to the axis of the bore, and four inserts are provided each having outwardly and forwardly extending flat planar attack surfaces forming with side surfaces of the insert the cutting edges diverging from the tips, each insert is a cast component having a surface adapted to sit on the seat means and a pair of surfaces to abut against respective abutment surfaces on other adjacent inserts, the locating pins are provided to locate each insert on the seat and the clamp means engages against the attack surfaces of the inserts to securely retain the inserts against the seat in cooperation with the locating pins.

4. The saw tooth as defined in claim 1, wherein the saw tooth is mounted on a holder which in turn is mounted on the circular saw blade which has an outer periphery, an axis of each saw tooth being tangential to the outer periphery of the circular saw blade with the front face of the teeth facing the direction of rotation of the saw blade.

5. The saw tooth as defined in claim 1, wherein four seats are defined in the front face of the tooth head and four inserts are provided, one on each seat, wherein each insert has a flat planar outwardly and forwardly sloping surface, a cutting tip and a pair of cutting edges diverging away from the cutting tip such that there is a cutting tip at each corner of the saw tooth.

6. The saw tooth as defined in claim 5, wherein each of the four seats formed on the front face of the head include flat planar surfaces sloping outwardly and forwardly, and each insert is a flat member with parallel flat planar faces, one face adapted to sit on the corresponding seat, the other parallel planar face forming the cutting edges of the insert.

7. A replaceable saw tooth for a circular saw blade having an axis of rotation, wherein the tooth comprises a tooth head of frusto-pyramidal configuration, having a front face, a rear face, and planar side walls extending therebetween, a central bore extending axially of the head between the rear face and the front face, the front face of the tooth head provided with a seat for receiving an insert, the insert being a cast monoblock having at least two cutting tips projecting away from the front face and located at corners corresponding to the side wall remote from the axis of rotation of the saw blade when the tooth is mounted on the saw blade, the insert including receding cutting edges extending from the tips such that there is a cutting edge formed between the pair of tips remote from the center of rotation of the blade, an opening centrally of the insert formed therein to be engaged by a bolt extending through the bore of the tooth head so as to securely retain the insert on the seat of the head, and the seat defining a cruciform-shaped recess and a complementary cruciform set of ribs is formed on the insert to be engaged in the cruciform recess to thereby prevent rotation of the insert relative to the tooth head when the insert is secured to the seat.

8. The saw tooth as defined in claim 7, wherein the single insert is provided with four cutting tips, one on each corner thereof, and cutting edges are subtended between each cutting tip and including divergent straight edges.

* * * * *